United States Patent
Bennett et al.

(10) Patent No.: US 8,656,056 B2
(45) Date of Patent: Feb. 18, 2014

(54) WEB-ENABLED MAINFRAME

(75) Inventors: Robert P. Bennett, Sayville, NY (US); Vincent R. Re, Saint James, NY (US)

(73) Assignee: CA, Inc., Islandia, NY (US)

( * ) Notice: Subject to any disclaimer, the term of this patent is extended or adjusted under 35 U.S.C. 154(b) by 603 days.

(21) Appl. No.: 12/779,410

(22) Filed: May 13, 2010

(65) Prior Publication Data

US 2011/0283019 A1  Nov. 17, 2011

(51) Int. Cl.
*G06F 15/16* (2006.01)

(52) U.S. Cl.
USPC ........................................ 709/246

(58) Field of Classification Search
None
See application file for complete search history.

(56) References Cited

U.S. PATENT DOCUMENTS

| | | | |
|---|---|---|---|
| 6,532,463 B1 | 3/2003 | Robbins et al. | |
| 6,636,845 B2 | 10/2003 | Chau et al. | |
| 6,643,633 B2 | 11/2003 | Chau et al. | |
| 6,691,125 B1 * | 2/2004 | Engle et al. | 1/1 |
| 6,721,727 B2 | 4/2004 | Chau et al. | |
| 7,028,093 B2 * | 4/2006 | Jaenecke et al. | 709/230 |
| 7,174,327 B2 | 2/2007 | Chau et al. | |
| 7,373,357 B2 | 5/2008 | Iyer et al. | |
| 7,469,248 B2 * | 12/2008 | Agrawal et al. | 1/1 |
| 7,552,135 B2 | 6/2009 | Iyer et al. | |
| 7,634,498 B2 | 12/2009 | Pal et al. | |
| 7,818,750 B2 * | 10/2010 | Dunki et al. | 718/106 |
| 2002/0123993 A1 | 9/2002 | Chau et al. | |
| 2003/0037183 A1 | 2/2003 | Hashem et al. | |
| 2003/0093436 A1 | 5/2003 | Brown et al. | |
| 2005/0049849 A1 * | 3/2005 | Re et al. | 703/26 |
| 2007/0050511 A1 * | 3/2007 | Dias | 709/229 |
| 2008/0059651 A1 * | 3/2008 | Ashwood Smith | 709/238 |
| 2010/0077071 A1 * | 3/2010 | Gaudio et al. | 709/224 |
| 2010/0088360 A1 * | 4/2010 | Jaudon et al. | 709/203 |

\* cited by examiner

*Primary Examiner* — Brian P Whipple
(74) *Attorney, Agent, or Firm* — Baker Botts, LLP

(57) ABSTRACT

According to one embodiment, a data sources interface of a mainframe receives a transaction request from a user terminal communicating through a network. The transaction request is formatted in a web-based format. A data sources function is called to instruct a mainframe application to perform the requested transaction, and the instruction to the mainframe is formatted in the native format of the mainframe. A transaction result formatted in the native format of the mainframe is received from the mainframe application. The transaction result is modified according to the web-based format to yield a data source, and the data source is sent to the user terminal.

21 Claims, 1 Drawing Sheet

WEB-ENABLED MAINFRAME

TECHNICAL FIELD

This invention relates generally to the field of mainframe computing and more specifically to a web-enabled mainframe.

BACKGROUND

Mainframes may provide resources for performing large-scale computing. To access a mainframe, users may log on to a green screen terminal connected directly to the mainframe. The user may control the mainframe by inputting data in platform-specific or proprietary formats. The data returned to the user may be displayed in a rudimentary format.

SUMMARY OF THE DISCLOSURE

According to one embodiment, a data sources interface of a mainframe receives a transaction request from a user terminal communicating through a network. The transaction request is formatted in a web-based format. A data sources function is called to instruct a mainframe application to perform the requested transaction, and the instruction to the mainframe is formatted in the native format of the mainframe. A transaction result formatted in the native format of the mainframe is received from the mainframe application. The transaction result is modified according to the web-based format to yield a data source, and the data source is sent to the user terminal.

Certain embodiments of the invention may provide one or more technical advantages. A technical advantage of one embodiment may be that a user may access a web-enabled mainframe remotely. Another technical advantage may be that a web-enabled mainframe may present data in a consistent, user-friendly format on the front-end while maintaining a platform-specific or proprietary format on the back-end. Maintaining back-end formats may simplify support of legacy mainframe products or applications.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Figure 1:
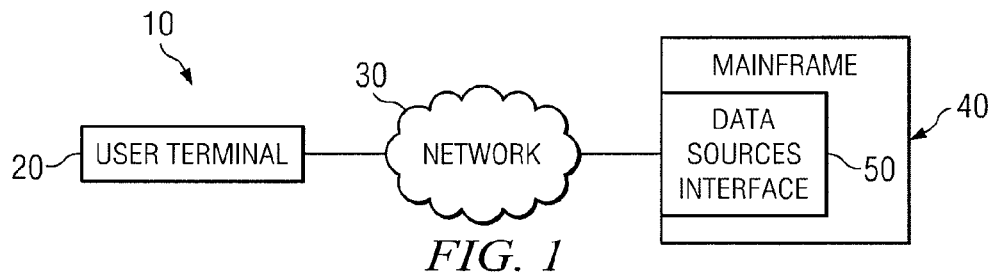
FIG. 1 illustrates an example of a system comprising a web-enabled mainframe.
Figure 2:
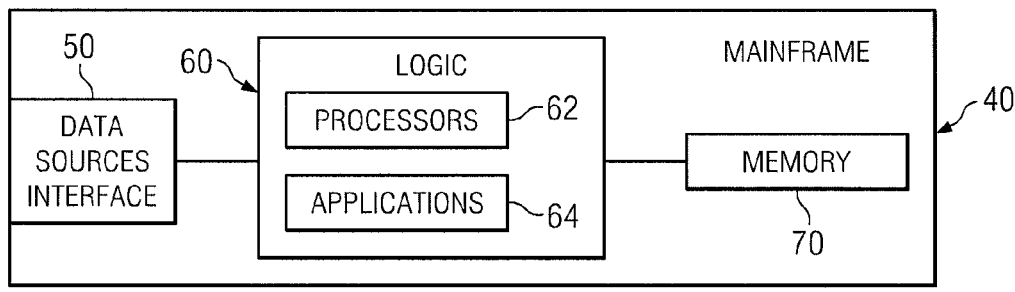
FIG. 2 illustrates an example of a web-enabled mainframe.
Figure 3:
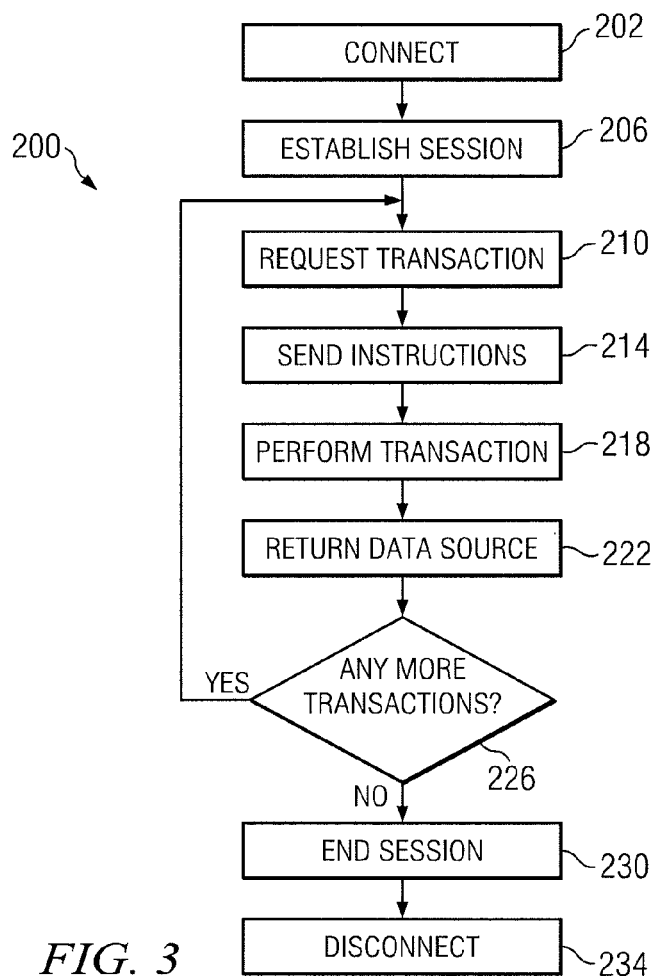
FIG. 3 illustrates an example of a method for performing a transaction using a web-enabled mainframe.

Embodiments of the present invention and its advantages are best understood by referring to FIGS. 1 through 3 of the drawings, like numerals being used for like and corresponding parts of the various drawings.

Mainframes may provide resources for performing large-scale computing. To access known mainframes, users may log on to a green screen terminal connected directly to the mainframe. The user may control the mainframe by inputting data in platform-specific or proprietary formats, and the data returned to the user may be displayed in a rudimentary format. Known mainframes, however, may fail to provide data in a user-friendly format that may be accessed remotely.

Embodiments of the present disclosure may present solutions to these and other problems associated with known mainframes. For example, in certain embodiments a web-enabled mainframe may be accessed remotely through a network using a web connection. In certain embodiments, a web-enabled mainframe may present data in a consistent, user-friendly format on the front-end while maintaining a platform-specific or proprietary format on the back-end. Maintaining back-end formats may simplify support of legacy mainframe products or applications.

FIG. 1 illustrates an example of a system 10 comprising a web-enabled mainframe. System 10 may include a user terminal 20, a network 30, and a mainframe 40. User terminal 20 may send data to and receive data from mainframe 40 via network 30. User terminal 20 may use a web-based language to request transactions, while mainframe 40 may use a native programming language to perform operations. In some embodiments, mainframe 40 may comprise a data sources interface 50 for interfacing between the web-based language and the mainframe native language.

User terminal 20 may include a wide range of products with computing capability, including, but not limited to, desktop, laptop, notebook, tablet, and server computers, as well as personal digital assistants ("PDAs"), internet devices, and mobile phones. User terminal 20 may be configured to communicate over any suitable connection, such as an internet connection. User terminal 20 may request transactions using a web-based format. A transaction may include an operation to be performed by mainframe 40 and parameters for performing the operation. In some embodiments, user terminal 20 may send transactions using a simple object access protocol (SOAP) over hypertext transfer protocol (HTTP) web services protocol. User terminal 20 may be configured to receive the results of the transaction in an organized and user-friendly format, such as an extensible markup language (XML) format. In some embodiments, the XML file may be presented to a user using Java or other web applications.

In some embodiments, network 30 may be any network for facilitating communication between user terminal 20 and mainframe 40, including, but not limited to, a public or private data network; a local area network (LAN); a metropolitan area network (MAN); a wide area network (WAN); a wireline or wireless network; a local, regional, or global communication network; an optical network; a satellite network; an enterprise intranet; other suitable communication links; or any combination of the preceding.

Mainframe 40 may provide resources for performing large-scale computing. In some embodiments, mainframe 40 may manage data stored in a relational database. The relational database may include a plurality of tables, and a subset of the tables may be related. As an example, one table may include information describing a subsystem, such as a name, a reference number, and a location of the subsystem. A related table may include additional information about the subsystem, such as the number of subsystem users, the number of subsystem tables, or other information. The databases of the mainframe may be accessed and/or modified according to the mainframe's native language, such as a platform-specific language or a proprietary language.

As an example, the native language of mainframe 40 may comprise structured query language (SQL). Operations that may be performed in SQL include query, insert, delete, and update operations. The query operation may allow a user to request to view a table of the relational database having a requested characteristic. Examples of requested characteristics may include a subsystem number or a location. The insert and delete operations may allow the user to add or remove entire rows or columns to the table. For example, subsystems may be inserted to the location table to add the subsystems to the particular location. The update operation may allow the user to modify the contents of one or more cells within the selected table, for example, to change the location of a subsystem.

In some embodiments, mainframe 40 may comprise a data sources interface 50 for interfacing between the web-based language of user terminal 20 and the mainframe native language of mainframe 40. Data sources interface 50 may layer web-services functionality on top of the legacy mainframe functionality. For example, data sources interface 50 may provide generic web services definitions to perform mainframe operations, such as SQL-like operations. Examples of SQL-like web services operations may include query, insert, delete, and update operations.

Upon receiving a web services transaction request, data sources interface 50 may call a data sources function configured to send instructions in the mainframe native language. In some embodiments, the data sources function may be an SQL statement or a plug-in, such as a C function or a restructured extended executor (REXX) script. Mainframe 40 may perform the operation and return a transaction result to the data sources interface 50 in the mainframe's native format. Different mainframe platforms may arrange the data of the transaction result in a variety of different ways.

Data sources interface 50 may modify the transaction result received from the mainframe 40 to yield a data source. A data source may comprise scalar values, arrays, complex structures, or other data arranged in rows and columns according to a web-based format, such as an XML schema definition. An XML schema definition may allow for arranging the data of the data source in a uniform, consistent way regardless of the mainframe platform. The data source may be sent to the user terminal 20 where it may be presented to the user in a user-friendly format.

FIG. 2 illustrates an example of web-enabled mainframe 40. In certain embodiments, mainframe 40 may include a data sources interface 50, logic 60, memory 70, and/or other suitable element. Data sources interface 50 receives input, sends output, processes the input and/or output, and/or performs other suitable operation. In certain embodiments, data sources interface 50 receives a transaction request from a user terminal in a web-based format and outputs an instruction in a mainframe native language. In certain embodiments, data sources interface 50 receives a transaction result in the mainframe native language, modifies the transaction result to yield a data source in the web-based format, and outputs the data source. Data sources interface 50 may comprise hardware and/or software.

Logic 60 performs the operations of the component, for example, executes instructions to generate output from input. In certain embodiments, logic 60 may perform a transaction initiated by a user terminal. For example, a user terminal may query the mainframe for certain data stored in a relational database of the mainframe. Logic 60 may receive instructions to obtain the data and may execute the instructions.

Logic 60 may include hardware (such as one or more processors 62), software (such as applications 64), and/or other logic. Logic 60 may be encoded in one or more tangible media and may perform operations when executed by a computer. Certain logic 60, such as a processor 62, may manage the operation of a component. Examples of a processor 62 include one or more computers, one or more microprocessors, one or more applications, and/or other logic.

In particular embodiments, the operations of the embodiments may be performed by one or more non-transitory, tangible computer readable media encoded with a computer program, software, computer executable instructions, and/or instructions capable of being executed by a computer. In particular embodiments, the operations of the embodiments may be performed by one or more computer readable media storing, embodied with, and/or encoded with a computer program and/or having a stored and/or an encoded computer program.

Memory 24 stores information. Memory 24 may comprise one or more tangible, computer-readable, and/or computer-executable storage medium, and may exclude signals or carrier waves. Examples of memory include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

FIG. 3 illustrates an example of a method 200 for performing a transaction using a web-enabled mainframe. The method 200 begins at step 202 where a user terminal and a mainframe establish a connection over a network. The connection may allow for sending and receiving messages between the user terminal and the mainframe.

At step 206, a logical session may be established between the user terminal and the mainframe. Establishing a session may include authenticating the user terminal and authorizing the user according to a user identifier, password, digital certificate, or other credentials. In some embodiments, a session configuration may be communicated or negotiated during this step. Configurable settings may include an encryption technique to be used or an amount of idle time that will result in a session timeout that ends the session. In some embodiments, a plurality of user terminals may maintain sessions with the mainframe at the same time. Accordingly, each session may be assigned a session identifier for identifying, organizing, and/or prioritizing transaction requests from the different user terminals.

A transaction may be requested at step 210. The user terminal may provide a user-friendly web application for accepting the transaction from a user and sending the transaction to the data sources interface of the mainframe. Examples of transactions may include a metadata query, a create, a query, an insert, an update, or a delete transaction. Transactions may be requested one at a time or linked in combination using transaction management. Transaction management may include complete, commit, and rollback operations. The complete operation indicates that linking is complete and the resulting combination of requests is ready to be applied, the commit operation applies the requested changes, and the rollback option does not apply the changes.

The metadata query may allow a user to determine the specific data sources available, the details of how to invoke them, and the structure of any outputs. Accordingly, the metadata query may be used to dynamically inform the user if new data sources are created or existing data sources are modified. Inputs to a metadata query may include a valid session identifier, the name of the data source being queried, the type of information requested, optional qualifiers, and cursor controls. The name of the data source being queried may specify a particular data source or a wildcard pattern potentially describing a plurality of data sources. The type of information requested may include data source names, locations, or full data source metadata. The optional qualifiers may restrict the search, for example, by user, by date, or by an element of the data source. Cursor controls may indicate the number of rows to return.

The output of the metadata query may include a data source name and location (e.g., a uniform resource identifier where the data source exists), basic metadata, usage metrics, attributes, parameters, content, dependencies, and output schema. Basic metadata may describe the data source version, the creator or last user to update the data source, text and/or key word descriptions of the data source, and the data source status, such as validated or not validated. Usage metrics may describe how many times the data source has been invoked, how many errors occurred, and so on. Attributes may describe transactions that may be performed for the particular data source (e.g., "query only" or "query and update"), whether the data source supports transaction management, security options, status, and so on. Parameters may describe input parameters needed by the data source, such as parameter names, data types, default values, and descriptions. Content may describe the actual implementation of the data source, expressed in the form of a handler and a blob or a reference. For example, the handler may describe the type of data source function that will instruct the mainframe to perform the transaction. In some embodiments, the function may be a C function, a REXX script, or a SQL statement. The blob may comprise the actual contents of the C function, the REXX script, or the SQL statement. Alternatively, content may be supplied by reference to a file, for example, a file path indicating a file stored on the local system. Dependencies may comprise a list of subordinate data sources or other items that the data source depends on. Output schema may comprise an XML schema describing the output of the data source, including field names, data types, and default values.

If the metadata query indicates that a desired data source does not exist, the user may request the create transaction to create a new data source. The create request may specify a valid session identifier, a name for the data source, a text and/or key word description of the data source, parameters, content, dependencies, and output schema. In some embodiments, an existing data source may be overwritten by creating a new data source using the name of the existing data source.

The query operation allows a user to retrieve a data source. Inputs to the query may include a valid session identifier, a data source name, required or optional parameters, cursor controls, and filtering rules to identify specific rows to be returned. The data source output from the query may be an XML document containing the requested results, version identifiers, and/or error messages.

The following Table 1 illustrates an example of data that may be requested using a query operation. The data includes a number, name, and location of the subsystems associated with a mainframe.

TABLE 1

| Subsystem Number | Subsystem Name | Location |
|---|---|---|
| 1 | System A | X |
| 2 | System B | X |
| 3 | System C | Y |

The insert, update, and delete operations may be used to modify the data source. Input parameters may include a valid session identifier, a data source name, any required or optional parameters, and the version identifier received during the preceding query. The version identifier may comprise a version number that may be incremented each time a data source is modified. If the version identifier provided in the insert, update, or delete request does not match the current version of the data source, the request may fail.

In some embodiments, version control may be accomplished by including a first data set and a second data set in the transaction request. The first data set may describe data received from a previous query (old data) and the second data set may describe user-requested modifications to the received data (new data). It may be determined whether the first data set matches the current configuration of the mainframe data. If the current configuration matches the first data set, the modifications described by the second data set may be applied. Version control may prevent the application of inconsistent or incompatible requests received from different users at approximately the same time.

An insert operation may insert additional rows to a table. For example, Table 2 illustrates an example in which subsystem number 4 has been inserted to the data described in Table 1.

TABLE 2

| Subsystem Number | Subsystem Name | Location |
|---|---|---|
| 1 | System A | X |
| 2 | System B | X |
| 3 | System C | Y |
| 4 | System D | Y |

An update operation may modify existing cells of a table. For example, Table 3 illustrates an example in which the location of subsystem number 4 has been updated.

TABLE 3

| Subsystem Number | Subsystem Name | Location |
|---|---|---|
| 1 | System A | X |
| 2 | System B | X |
| 3 | System C | Y |
| 4 | System D | Z |

A delete operation may remove rows of a table. For example, Table 4 illustrates an example in which subsystem number 2 has been deleted.

TABLE 4

| Subsystem Number | Subsystem Name | Location |
|---|---|---|
| 1 | System A | X |
| 3 | System C | Y |
| 4 | System D | Z |

In some embodiments, a delete request may include only a valid session identifier and a data source name in order to delete the entire table.

In addition to the query, insert, update, and delete transactions, the user may request control operations. Control operations may include locating data source servers, configuring data source servers (setting up debugging options, performance options, security policies, and so on), establishing database backup, consolidation, or management functions, session management, and sending ping requests. In addition, notifications may be established to notify the user when a particular data source has been modified. The notification request may include a valid session identifier, a data source name, a location to send the notification, a list of transactions that generate a notification (e.g., insert, update, and delete), a minimum time interval between notification messages, and an optional timer that determines when to stop providing notifications.

At step 214, the data sources interface may instruct the mainframe to perform the requested transaction. For example, upon receiving the user terminal's web-based transaction request, the data sources interface may call a data sources function. The data sources function may comprise a C function, a REXX script, or an SQL statement configured to send instructions to the mainframe in the mainframe's native language.

The data sources interface may use any suitable method for translating a web-based transaction request to a mainframe instruction. For example, the data sources interface may use an internal format for representing the data, and may parse the web-based transaction request, such as a SOAP/XML request, to extract the data into the internal format. The internal format may be specific to the mainframe programming environment and may require translating character data encoding. As an example, the character data may be translated from UTF-8 encoding, which may be used in SOAP/XML, to Extended Binary Coded Decimal Interchange Code (EBCDIC) encoding, which may be native to a z/OS operating system. The internal data format may be used when passing the data items to the data sources functions. In the case of C functions, the internal format may be accessed directly. For REXX scripts, the internal format may be converted to a set of native script variables that can be accessed directly from the REXX code. For SQL, the internal format may be used to generate actual native SQL statements which may be passed to a database engine for processing on the backend.

The mainframe may perform the transaction at step 218. The mainframe may return a transaction result to the data sources interface. The transaction result may be formatted in the native format of the mainframe.

The data sources interface may return a data source to the user terminal at step 222. For example, the data sources interface may modify the transaction result according to the web-based format to yield the data source and may send the data source to the user terminal. In some embodiments, the data sources interface receives results from the C function, REXX script, or SQL in the data sources internal format, transforms the results back to the web-based format, such as a UTF-8 SOAP/XML, and returns them to the User Terminal.

At step 226, it may be determined if there are any more transactions. If there are more transactions, the method returns to step 210 to request the transactions. If there are no more transactions, for example, if the user requests to logoff the session or the session times out, the method proceeds to step 230 to end the logical session. Upon ending the session, subsequent transaction requests may not be performed without establishing a new session as described in step 206. At step 234, the communication between the user terminal and the mainframe may be disconnected and the method ends.

Modifications, additions, or omissions may be made to the systems and apparatuses described herein without departing from the scope of the invention. The components of the systems and apparatuses may be integrated or separated. For example, in some embodiments the data sources interface may be internal or external to the mainframe. Moreover, the operations of the systems and apparatuses may be performed by more, fewer, or other components. As used in this document, "each" refers to each member of a set or each member of a subset of a set.

Modifications, additions, or omissions may be made to the methods described herein without departing from the scope of the invention. The methods may include more, fewer, or other steps. Additionally, steps may be performed in any suitable order.

Certain embodiments of the invention may provide one or more technical advantages. A technical advantage of one embodiment may be that a mainframe may interface with web services without requiring the mainframe programmers to learn and implement intricate web services languages that require a completely different structure than native mainframe languages. This may allow mainframe programmers to easily add functionality to the mainframe. Similarly, a programmer who is skilled in using web services does not need to be familiar with the intricacies of the mainframe language in order to interact with the mainframe. Additionally, the use of plug-ins, such as C or REXX plug-ins, may provide the ability to perform advanced functions based on commands included in the web services calls, and to interact with other services on the operating system.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed is:

1. A method comprising:
receiving, by a data sources interface of a mainframe, a transaction request formatted in a web-based format, the transaction request received from a user terminal communicating with the data sources interface through a network;
calling a data sources function, the data sources function configured to instruct a mainframe application to perform the requested transaction, the instruction formatted in the native format of the mainframe;
receiving a transaction result from the mainframe application, the transaction result formatted in the native format of the mainframe;
modifying the transaction result according to the web-based format to yield a data source;
sending the data source to the user terminal; and
facilitating version control between the user terminal and the mainframe, the version control allowing modifications to mainframe data indicated by the transaction request if the transaction request corresponds to a current version of mainframe data.

2. The method of claim 1, the web-based format further comprising a web services format.

3. The method of claim 1, the data sources function further comprising a C function, a REXX script, or an SQL statement.

4. The method of claim 1, the data source further comprising a table comprising one or more rows and one or more columns, the rows and columns defined according to XML rules.

5. The method of claim 1, the transaction request further comprising a query, insert, delete, or update request.

6. The method of claim 1, further comprising:
the transaction request comprising a first data set and a second data set, the first data set describing data received from a previous query, the second data set describing user-requested modifications to the received data;

determining whether the first data set matches a current configuration of the mainframe data; and instructing the mainframe to apply the modifications described by the second data set if the current configuration and the first data set match.

7. A system comprising:

a data sources interface operable to:
  receive a transaction request formatted in a web-based format, the transaction request received from a user terminal communicating with the data sources interface through a network; and
  send a data source to the user terminal; and one or more processors comprising hardware and operable to
  call a data sources function, the data sources function configured to instruct a mainframe application to perform the requested transaction, the instruction formatted in the native format of the mainframe;
  receive a transaction result from the mainframe application, the transaction result formatted in the native format of the mainframe;
  modify the transaction result according to the web-based format to yield the data source; and
  facilitate version control between the user terminal and the mainframe, the version control allowing modifications to mainframe data indicated by the transaction request if the transaction request corresponds to a current version of mainframe data.

8. The system of claim 7, the web-based format further comprising a web services format.

9. The system of claim 7, the data sources function further comprising a C function, a REXX script, or an SQL statement.

10. The system of claim 7, the data source further comprising a table comprising one or more rows and one or more columns, the rows and columns defined according to XML rules.

11. The system of claim 7, the transaction request further comprising a query, insert, delete, or update request.

12. The system of claim 7, further comprising:
  the transaction request comprising a first data set and a second data set, the first data set describing data received from a previous query, the second data set describing user-requested modifications to the received data;
  the one or more processors further operable to:
    determine whether the first data set matches a current configuration of the mainframe data; and
    instruct the mainframe to apply the modifications described by the second data set if the current configuration and the first data set match.

13. Logic embodied in a non-transitory computer-readable storage medium, the logic operable to:
  receive, by a data sources interface of a mainframe, a transaction request formatted in a web-based format, the transaction request received from a user terminal communicating with the data sources interface through a network;
  call a data sources function, the data sources function configured to instruct a mainframe application to perform the requested transaction, the instruction formatted in the native format of the mainframe;
  receive a transaction result from the mainframe application, the transaction result formatted in the native format of the mainframe;
  modify the transaction result according to the web-based format to yield a data source;
  send the data source to the user terminal; and
  facilitate version control between the user terminal and the mainframe, the version control allowing modifications to mainframe data indicated by the transaction request if the transaction request corresponds to a current version of mainframe data.

14. The logic of claim 13, the web-based format further comprising a web services format.

15. The logic of claim 13, the data sources function further comprising a C function, REXX script, or an SQL statement.

16. The logic of claim 13, the data source further comprising a table comprising one or more rows and one or more columns, the rows and columns defined according to XML rules.

17. The logic of claim 13, the transaction request further comprising a query, insert, delete, or update request.

18. The logic of claim 13, further comprising:
  the transaction request comprising a first data set and a second data set, the first data set describing data received from a previous query, the second data set describing user-requested modifications to the received data;
  the logic further operable to:
    determine whether the first data set matches a current configuration of the mainframe data; and
    instruct the mainframe to apply the modifications described by the second data set if the current configuration and the first data set match.

19. The logic of claim 13, further operable to:
  determine one or more users configured to receive notifications associated with the data source; and
  send a notification to the one or more users if the mainframe performs an insert, delete, or update operation associated with the data source.

20. The logic claim 13, wherein the transaction request includes a first request and a second request, the first request linked to the second request in order to facilitate performing the first request in combination with the second request.

21. The logic of claim 13, wherein the transaction request comprises a metadata query that requests metadata describing one or more available data sources.

* * * * *